United States Patent
Chen et al.

(10) Patent No.: US 9,686,772 B2
(45) Date of Patent: Jun. 20, 2017

(54) METHODS AND APPARATUS FOR COORDINATED MULTIPOINT (COMP) COMMUNICATIONS

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US); Tao Luo, San Diego, CA (US); Stefan Geirhofer, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 13/951,250

(22) Filed: Jul. 25, 2013

(65) Prior Publication Data

US 2014/0036806 A1  Feb. 6, 2014

Related U.S. Application Data

(60) Provisional application No. 61/678,561, filed on Aug. 1, 2012, provisional application No. 61/707,196, filed on Sep. 28, 2012, provisional application No. 61/721,935, filed on Nov. 2, 2012, provisional application No. 61/754,389, filed on Jan. 18, 2013.

(51) Int. Cl.
*H04W 72/04* (2009.01)
*H04L 5/00* (2006.01)

(52) U.S. Cl.
CPC ....... *H04W 72/0406* (2013.01); *H04L 5/0035* (2013.01); *H04L 5/0048* (2013.01); *H04L 5/0091* (2013.01); *H04L 5/0007* (2013.01); *H04L 5/0023* (2013.01)

(58) Field of Classification Search
CPC ............. H04W 72/0406; H04L 5/0091; H04L 5/0048; H04L 5/0035; H04L 5/0023; H04L 5/0007
See application file for complete search history.

(56) References Cited

U.S. PATENT DOCUMENTS

| | | | |
|---|---|---|---|
| 2005/0050427 A1* | 3/2005 | Jeong et al. | 714/755 |
| 2009/0046672 A1 | 2/2009 | Malladi et al. | |
| 2011/0317657 A1 | 12/2011 | Chmiel et al. | |
| 2012/0155362 A1 | 6/2012 | Montojo et al. | |
| 2012/0182946 A1 | 7/2012 | Chen et al. | |
| 2012/0281636 A1* | 11/2012 | Xiao et al. | 370/329 |
| 2013/0010707 A1 | 1/2013 | Gaal et al. | |
| 2013/0039199 A1* | 2/2013 | Liao | H04B 7/0626 370/252 |
| 2013/0194931 A1* | 8/2013 | Lee | H04L 5/0053 370/241 |

(Continued)

OTHER PUBLICATIONS

International Search Report and Written Opinion—PCT/US2013/052201—ISA/EPO—Sep. 19, 2013.

(Continued)

*Primary Examiner* — Mohammad Anwar

(57) ABSTRACT

Certain aspects of the present disclosure relate to methods and apparatus for Coordinated Multipoint (CoMP) communications. Certain aspects relate to methods and apparatus for determining resource mapping and/or rate matching for CoMP operations.

85 Claims, 9 Drawing Sheets

(56) References Cited

U.S. PATENT DOCUMENTS

| | | | |
|---|---|---|---|
| 2013/0208604 A1* | 8/2013 | Lee | H04L 25/0226 370/252 |
| 2014/0016596 A1* | 1/2014 | Kim | H04L 5/001 370/329 |
| 2015/0016371 A1* | 1/2015 | Lee | H04J 11/0053 370/329 |
| 2015/0208392 A1* | 7/2015 | Park | H04B 7/024 370/329 |

OTHER PUBLICATIONS

LG Electronics: "Required Downlink Control signaling for CoMP", 3GPP Draft; R1-122299, 3rd Generation Partnership Project (3GPP), Mobile Competence Centre ; 650, Route Des Lucioles ; F-06921 Sophia-Antipolis Cedex ; France, vol. RAN WG1, No. Prague, Czech Republic; 20120521-20120525, May 12, 2012, XP050600562, [retrieved on May 12, 2012].

ZTE: "Consideration on downlink control signaling configuration for CoMP", 3GPP Draft; R1-113015, DL Control Comp, 3rd Generation Partnership Project (3GPP), Mobile Competence Centre ; 650, Route Des Lucioles ; F-06921 Sophia- Antipolis Cedex ; France, vol. RAN WG1, No. Zhuhai; 20111010, Oct. 4, 2011, XP050538198, [retrieved on Oct. 4, 2011].

ZTE: "Downlink control signaling for CoMP", 3GPP Draft; R1-122143 Comp DL Control Signaling, 3rd Generation Partnership Project (3GPP), Mobile Competence Centre ; 650, Route Des Lucioles ; F-06921 Sophia-Antipolis Cedex ; France, vol. RAN WG1, No. Prague, Czech Republic; 20120521-20120525, May 12, 2012, XP050600411, [retrieved on May 12, 2012].

Zheng R., et al., "Performance Analysis and Algorithm Research of Coordinated Multi-Point Transmission Technology in a LTE-A System", Modern Science & Technology of Telecommunications, Mar. 31, 2010, pp. 85-90.

* cited by examiner

METHODS AND APPARATUS FOR COORDINATED MULTIPOINT (COMP) COMMUNICATIONS

CROSS-REFERENCE TO RELATED APPLICATIONS

The present patent application claims priority to U.S. Provisional Application No. 61/678,561, filed Aug. 1, 2012, U.S. Provisional Application No. 61/707,196, filed Sep. 28, 2012, U.S. Provisional Application No. 61/721,935, filed Nov. 2, 2012, and U.S. Provisional Application No. 61/754,389, filed Jan. 18, 2013, all of which are assigned to the assignee of the present application and hereby expressly incorporated by reference in their entirety.

FIELD

Certain aspects of the present disclosure generally relate to wireless communications.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, and Orthogonal Frequency Division Multiple Access (OFDMA) systems.

In recent additions to wireless communication systems, under the so called LTE-Advanced feature set (e.g. 3GPP TS 36.920), different functionalities are defined for which several cells cooperate together to increase spectral efficiency, the quality and performance of the air interface. An example of such a functionality is the Coordinated Multi-Point (CoMP) that has been introduced to increase system spectral efficiency in a MIMO-like approach and is about to be fully standardized by the $3^{rd}$ Generation Partnership Project (3GPP).

SUMMARY

Certain aspects of the present disclosure provide a method for wireless communications by a user equipment (UE). The method generally includes receiving signaling indicating different reference signal (RS) configurations for a set of base stations participating in Coordinated Multipoint (CoMP) operations to the user equipment (UE), each configuration identifying resources for use by one or more of the base stations in transmitting reference signals, receiving a downlink transmission in a subframe, and determining how to perform rate matching for the downlink transmission based on one or more of the RS configurations.

Certain aspects of the present disclosure provide an apparatus for wireless communications. The apparatus generally includes means for receiving signaling indicating different reference signal (RS) configurations for a set of base stations participating in Coordinated Multipoint (CoMP) operations to the user equipment (UE), each configuration identifying resources for use by one or more of the base stations in transmitting reference signals, means for receiving a downlink transmission in a subframe, and means for determining how to perform rate matching for the downlink transmission based on one or more of the RS configurations.

Certain aspects of the present disclosure provide an apparatus for wireless communications. The apparatus generally includes a processing system configured to receive signaling indicating different reference signal (RS) configurations for a set of base stations participating in Coordinated Multipoint (CoMP) operations to the user equipment (UE), each configuration identifying resources for use by one or more of the base stations in transmitting reference signals, receive a downlink transmission in a subframe, and determine how to perform rate matching for the downlink transmission based on one or more of the RS configurations.

Certain aspects of the present disclosure provide a computer-program product for wireless communications. The computer-program product generally includes a computer-readable medium having instructions stored thereon for receiving signaling indicating different reference signal (RS) configurations for a set of base stations participating in Coordinated Multipoint (CoMP) operations to the user equipment (UE), each configuration identifying resources for use by one or more of the base stations in transmitting reference signals, receiving a downlink transmission in a subframe, and determining how to perform rate matching for the downlink transmission based on one or more of the RS configurations.

Certain aspects of the present disclosure provide a method for wireless communications by a user equipment (UE). The method generally includes receiving signaling indicating a configuration of one or more starting symbol indices for downlink transmissions from a set of base stations participating in coordinated multipoint (CoMP) operations, receiving a downlink transmission in a subframe, and determining a starting symbol index for the downlink transmission based on the configuration.

Certain aspects of the present disclosure provide an apparatus for wireless communications by a user equipment (UE). The apparatus generally includes means for receiving signaling indicating a configuration of one or more starting symbol indices for downlink transmissions from a set of base stations participating in coordinated multipoint (CoMP) operations, means for receiving a downlink transmission in a subframe, and means for determining a starting symbol index for the downlink transmission based on the configuration.

Certain aspects of the present disclosure provide an apparatus for wireless communications by a user equipment (UE). The apparatus generally includes a receiver configured to receive signaling indicating a configuration of one or more starting symbol indices for downlink transmissions from a set of base stations participating in coordinated multipoint (CoMP) operations and to receive a downlink transmission in a subframe, and a processor configured to determine a starting symbol index for the downlink transmission based on the configuration.

Certain aspects of the present disclosure provide a computer-program product for wireless communications. The computer-program product generally includes a computer-readable medium having instructions stored thereon for receiving signaling indicating a configuration of one or more starting symbol indices for downlink transmissions from a set of base stations participating in coordinated multipoint (CoMP) operations, receiving a downlink transmission in a subframe, and determining a starting symbol index for the downlink transmission based on the configuration.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
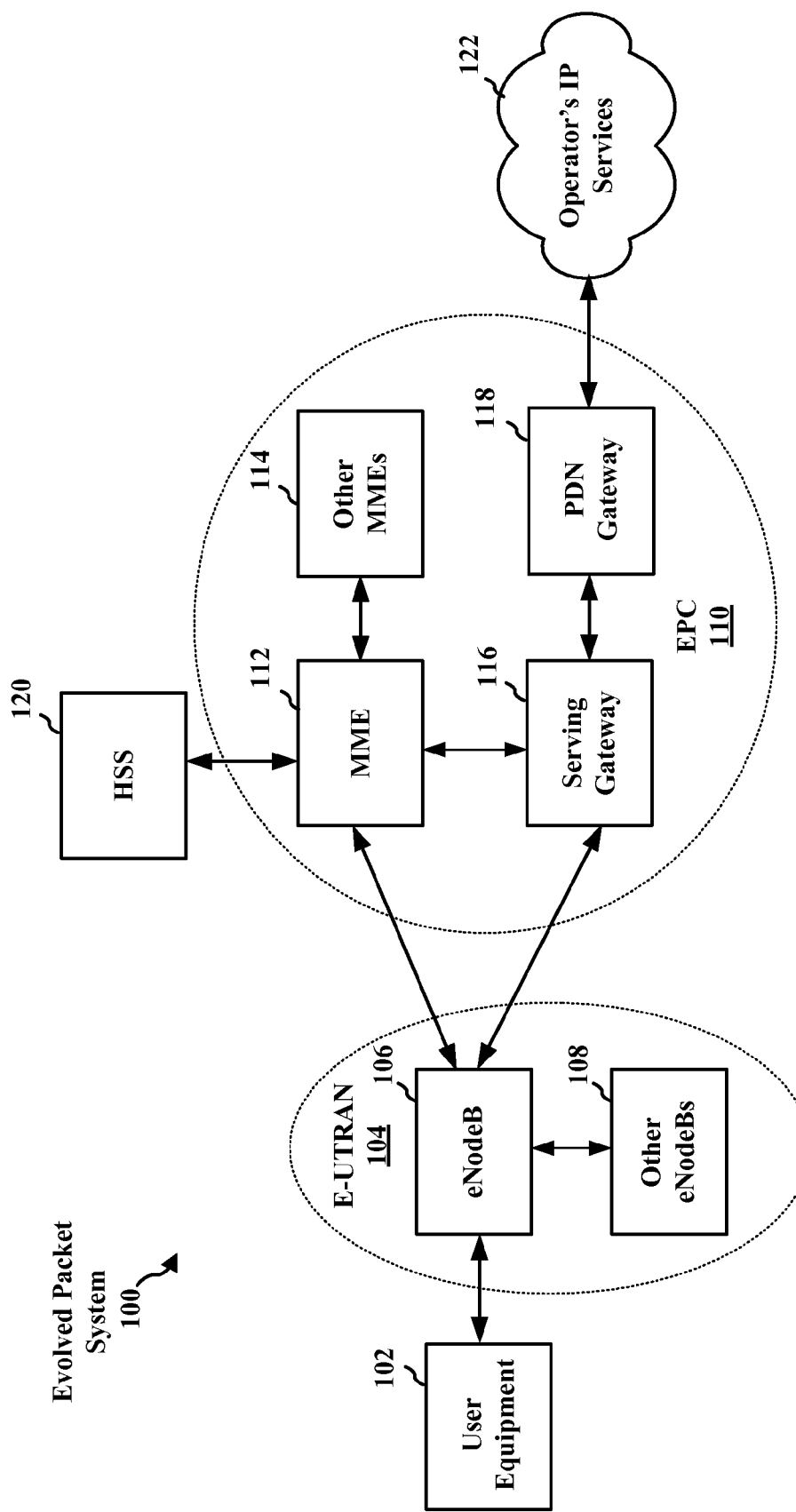
FIG. 1 is a diagram illustrating an example of a network architecture, in accordance with certain aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating a LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
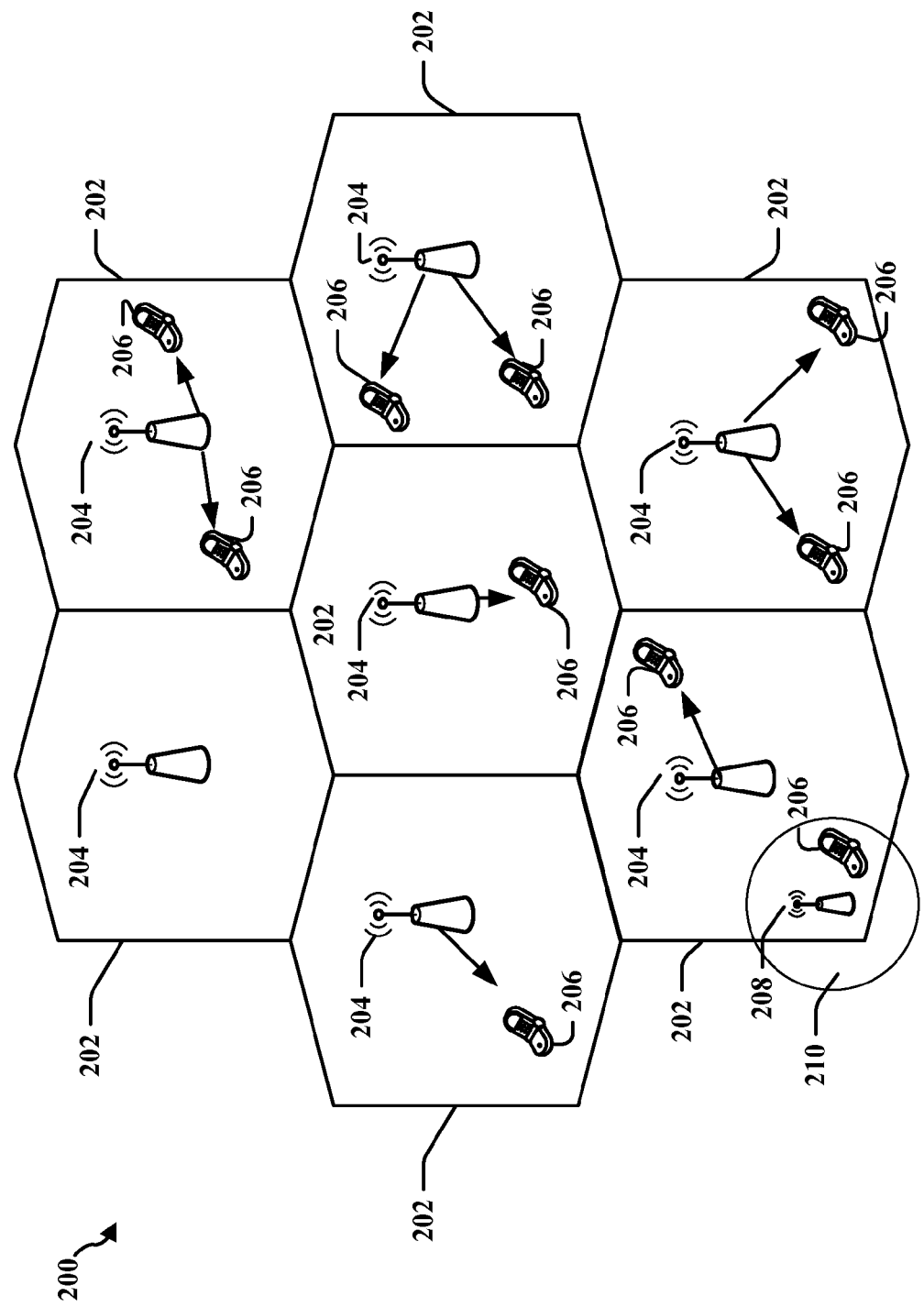
FIG. 2 is a diagram illustrating an example of an access network, in accordance with certain aspects of the present disclosure.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
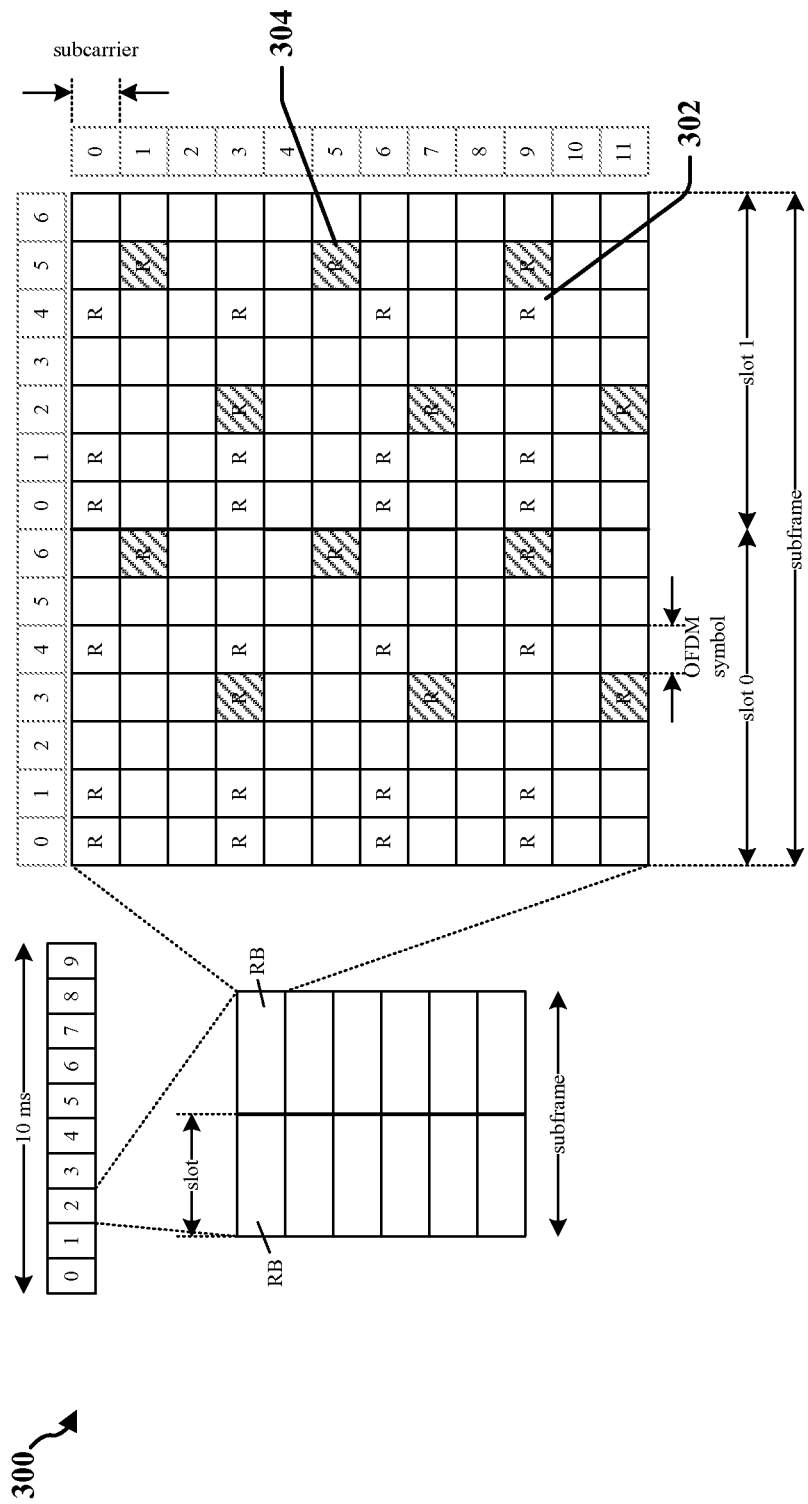
FIG. 3 is a diagram illustrating an example of a downlink (DL) frame structure in LTE, in accordance with certain aspects of the present disclosure.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
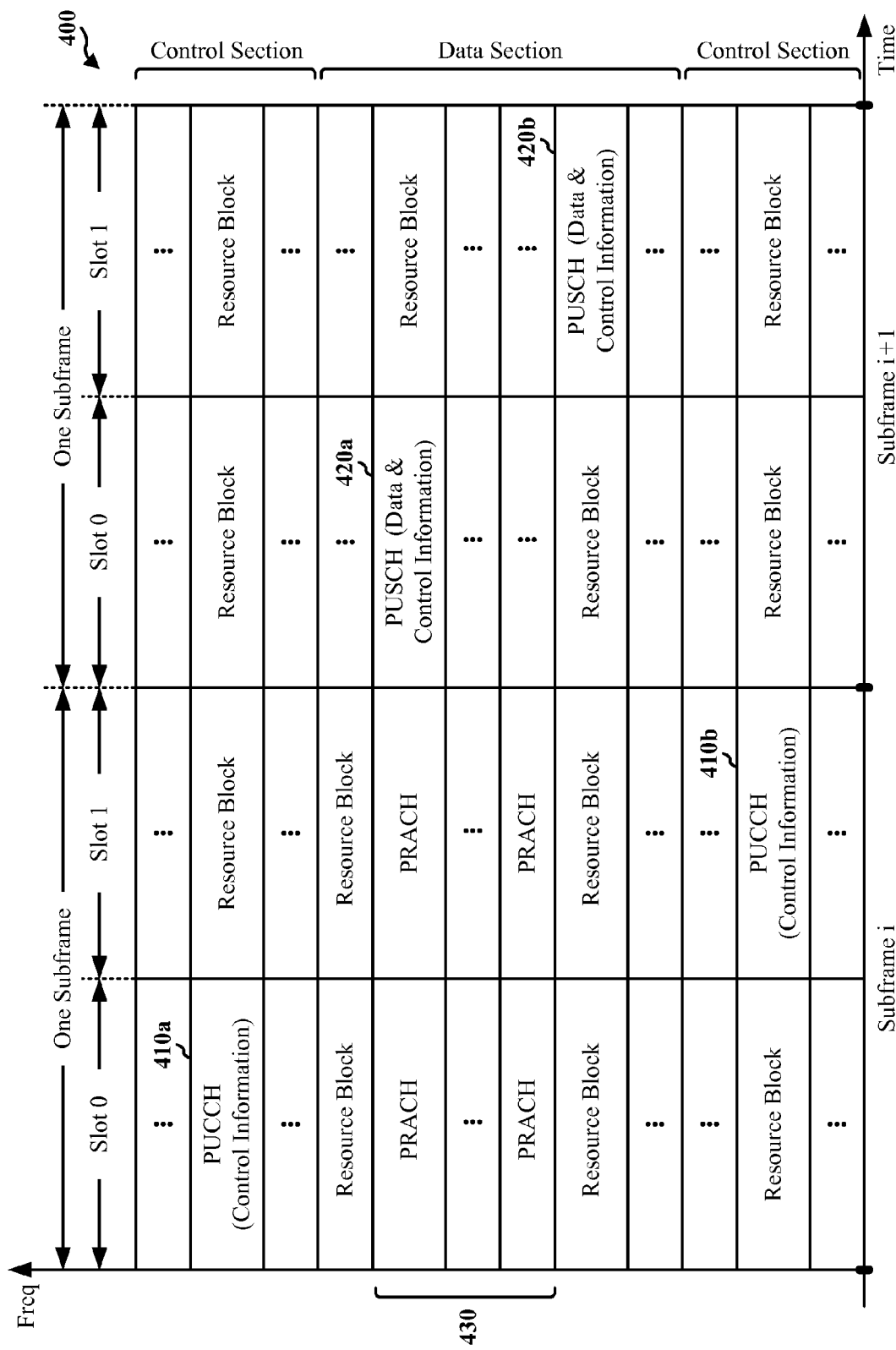
FIG. 4 is a diagram illustrating an example of an uplink (UL) frame structure in LTE, in accordance with certain aspects of the present disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
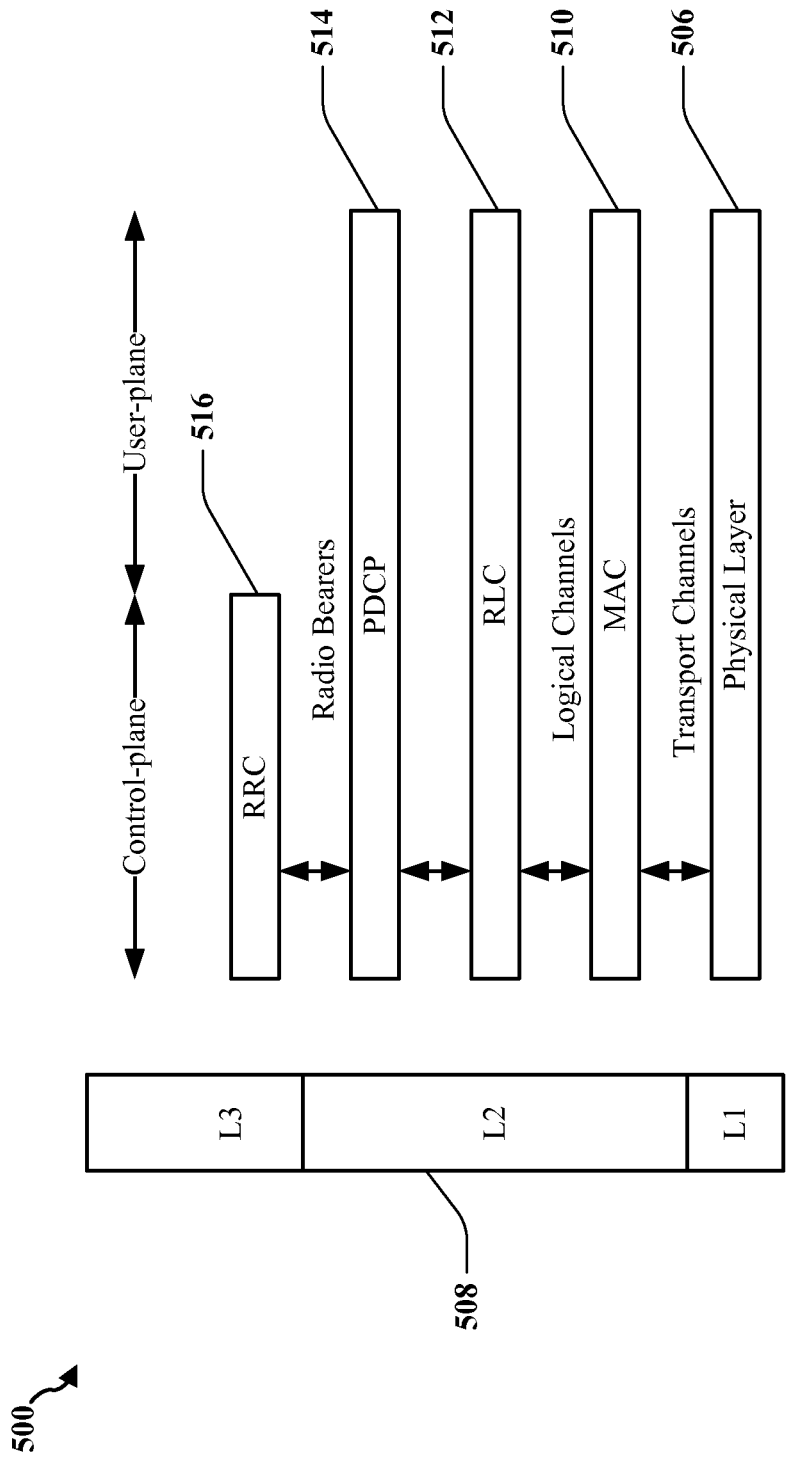
FIG. 5 is a diagram illustrating an example of a radio protocol architecture for the user and control planes, in accordance with certain aspects of the present disclosure.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
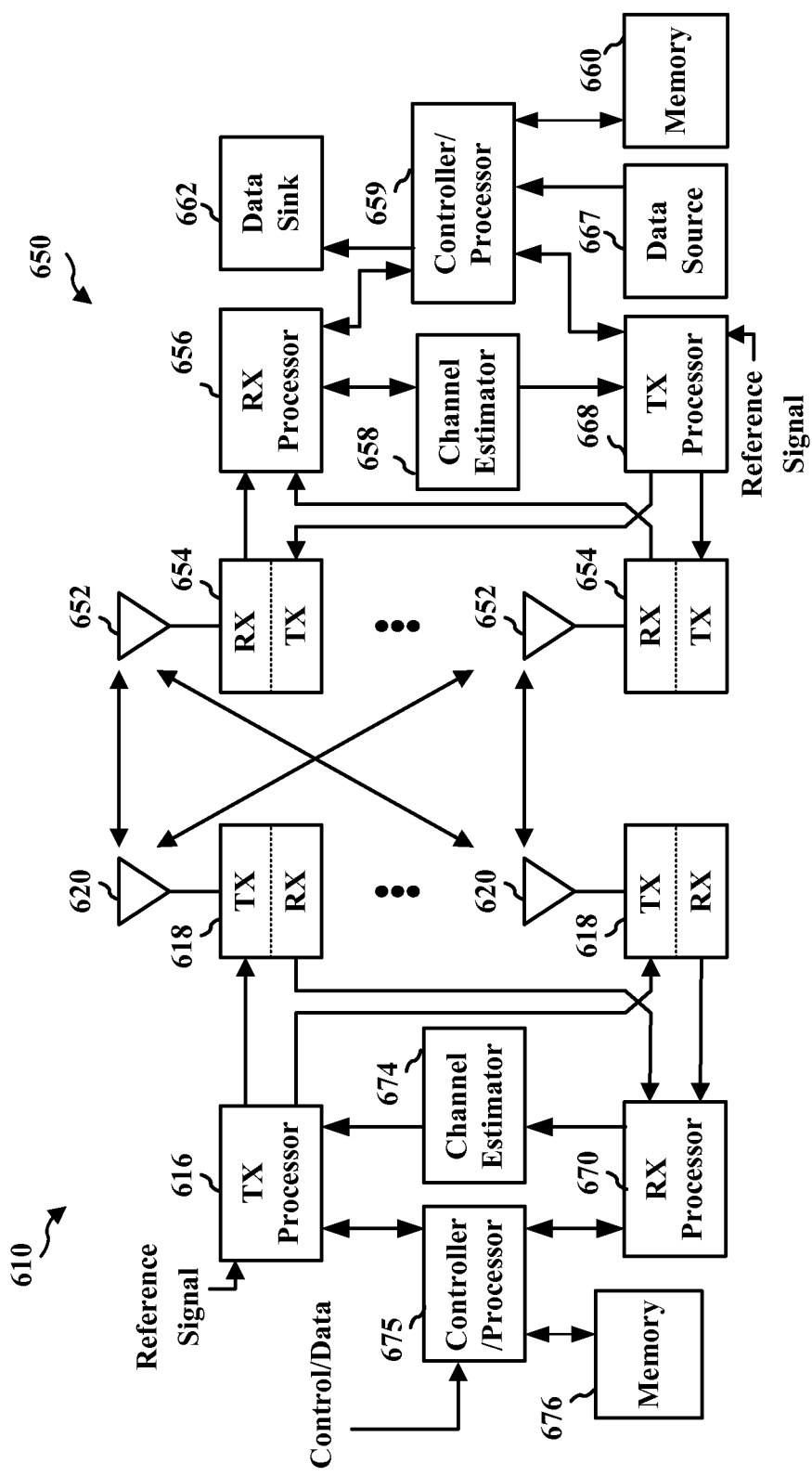
FIG. 6 is a diagram illustrating an example of an evolved Node B (eNB) and user equipment (UE) in an access network, in accordance with certain aspects of the present disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Methods and Apparatus for Coordinated Multipoint Communications

As noted above, in recent additions to wireless communication systems, such as the so called LTE-Advanced feature set (e.g. 3GPP TS 36.920), different functionalities are defined for which several cells cooperate together to increase spectral efficiency, the quality and performance of the air interface. An example of such a functionality is Coordinated Multi-Point (CoMP) operation that has been introduced to increase system spectral efficiency in a MIMO-like approach (where different base stations involved in a CoMP operation may be considered analogous to a separate MIMO Tx antenna) and is about to be fully standardized by the $3^{rd}$ Generation Partnership Project (3GPP). The present methods and apparatus include resource mapping for CoMP transmission schemes and the processing communications based on such mapping.

Figure 7:
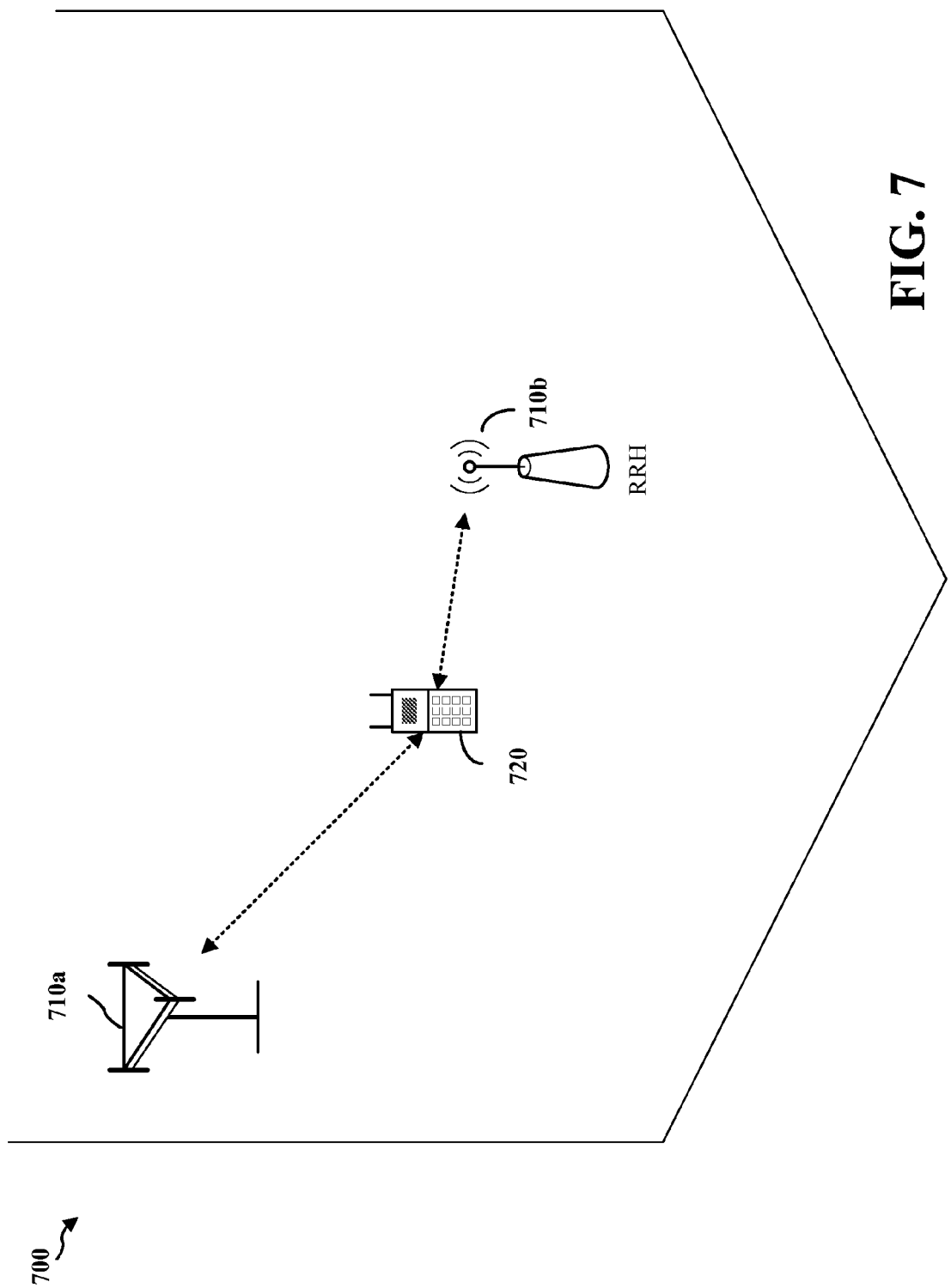
FIG. 7 illustrates an example Coordinated Multipoint (CoMP) system, in accordance with certain aspects of the present disclosure.

FIG. 7 illustrates an example system, in which a plurality of base stations 710 (e.g., a serving eNB 710*a* and a remote radio head RRH 710*b*) may coordinate transmissions to one or more UEs 720 using one or more CoMP schemes. Base stations 710 and UEs 720 may be configured to participate in CoMP schemes, taking advantage of techniques, described in greater detail below, to account for different base stations utilizing different data resource elements (REs) (different numbers and/or locations of data REs).

As used herein, the term CoMP scheme generally refers to a particular scheme used by multiple base stations to coordinate transmissions to one or more UEs. Some examples of CoMP schemes include joint transmission, Distributed MIMO, coordinated beamforming, dynamic point switching, and the like.

In a joint transmission CoMP scheme, multiple base stations (or eNBs) typically transmit the same data meant for a UE. For example, the coordinating base stations may utilize a joint precoding vector that spans all of the antennas of all the involved base stations.

In a Distributed MIMO CoMP scheme, multiple base stations typically transmit different pieces of data meant for a UE as different MIMO layers. For example, one layer may be sent by one base station, a second layer sent by a second base station, and so on, up to the number of supported layers.

In a Coordinated beamforming CoMP scheme, each particular base station transmits to its UE (that it serves) using beams that are chosen to reduce interference to UEs served by participating CoMP base stations in other neighboring cells.

In a dynamic point switching CoMP scheme, the serving base station for a UE may change over time within a set of base stations.

One issue with CoMP schemes arises because the particular REs used for data by the different CoMP base stations are different. The exact number and location of data REs used by different base stations may be different for one or more various reasons. For example, different base stations may have different numbers of control symbols, leaving different numbers of REs available for data. As other examples, the location of CRS may be different, their CSI-RS patterns may be different, and/or their patterns of muted REs may be different. As used herein, the term muted RE generally refers to REs on which a base station limits transmission, for example, to reduce interference with other base stations or to facilitate interference measurement for other base stations. As an example of such limited transmission, some REs may be transmitted with zero power.

In accordance with various systems, different carrier types may be supported. For example, in LTE Rel-9 to Rel-11, all carriers may be backward compatible to Rel-8 (e.g., "legacy carrier type" or LCT). In these cases, CRS may be present in all subframes. In MBSFN subframes, CRS may only be present in the non-MBSFN region of the subframes.

In Rel-12 and beyond, for example, a new carrier type (NCT), not necessarily backward compatible, may be introduced. With NCT, the presence of CRS may be only in a subset of subframes (e.g., every 5 subframes), may be limited to only one antenna port, and may be narrowband. This may help reduce DL overhead and provide energy savings for eNB. A carrier of NCT may be a standalone or part of carrier aggregation. In some cases, NCT may not have the legacy control region, at least in some subframes (if not in all subframes). NCT may completely rely on an enhanced Physical Downlink Control Channel (ePDCCH) (transmitted using resources traditionally used for Physical Downlink Shared Channel (PDSCH)), and potentially enhanced Physical Control Format Indicator Channel (ePCFICH) and/or enhanced PHICH (ePHICH) for the control signaling, or control from another carrier. In some embodiments, NCT may employ resources which are originally intended for a first purpose for a second purpose. In some embodiments, NCT may employ resources which are traditionally employed for a first purpose for a second purpose.

In Rel-11, for example, coordinated multipoint (CoMP) transmission schemes may be supported. As noted above, CoMP may refer to schemes where multiple base stations coordinate transmissions to (e.g., DL CoMP) or receptions from (e.g., UL CoMP) one or more UEs. DL CoMP and UL CoMP can be separately or jointed enabled for a UE.

As noted above, some examples of CoMP schemes are: joint transmission (JT) (e.g., DL CoMP) where multiple eNBs transmit the same data meant for a UE, joint reception (e.g., UL CoMP) where multiple eNBs receive the same data meant for a UE, coordinated beamforming (CBF) where an eNB transmits to its UE using beams that are chosen to reduce interference to UEs in neighboring cells, and Dynamic Point(s) Selection (DPS) where the cell(s) involved in data transmissions may change from subframe to subframe.

CoMP may exist in homogeneous networks (e.g., with the same types of base stations) and/or heterogeneous networks (e.g., HetNet, with base stations of different power class types, such as macro, pico, and/or femto nodes). The connection between the nodes involved in CoMP can be X2 (some latency, limited bandwidth) or fiber (minimum latency and "unlimited" bandwidth). In HetNet CoMP, low power nodes are sometimes also called remote radio heads (RRHs).

In some systems, it may be agreed for DM-RS sequence initialization to configure UEs to use two candidate values of X: x(0) and x(1). The scrambling identity number (nSCID) may be reused for dynamic selection of x(0) or x(1) only for rank 1 and 2. In some cases, nSCID may be equal to 0 for the rank larger than 2 and x(0) may be used. The value range of x(n) ($0 \leq n < 2$) may be, for example, 0-503.

In some cases, signaling may be provided to indicate the CRS position of at least one cell from which PDSCH transmission may occur. This signaling may identify at least the frequency shift.

If the signaling is transmitted, PDSCH processing may follow, for example, the Rel-10 rate matching around the indicated CRS of a single cell; otherwise (e.g., if the signaling is not transmitted), the UE may assume the CRS positions of the serving cell.

Various details may be considered for CRS transmission in CoMP systems. For example, CRS transmission in CoMP scenarios may have the following design details: number of antenna ports (e.g., in LTE Rel-8/9/10/11, can be 1, 2, or 4 antenna ports (e.g., ports 0 to 3), in LTE Rel-12, for example, can be 0 antenna ports (at least for some subframes)).

Various subframe types may also affect CRS transmission. For example, in non-MBSFN subframes, CRS port 0 and port 1 are present in four symbols, while CRS ports 2 and 3 are present in two symbols. In MBSFN subframes, each CRS port is only present in one symbol (e.g., non-MBSFN region), while there is no CRS in the MBSFN region. Each CRS port may have a frequency shift of 6, based on the physical cell ID NIDCell of the cell. CRS may also be TDD specific. For example, in special subframes, CRS may only be present in DwPTS, where the length of DwPTS depends on the special subframe configuration and the CP type. In addition, in some systems, different cells may have different DL/UL subframe configurations.

The present disclosure addresses the following issues: CRS-related parameters, PDSCH rate matching dependency, fallback, ePDCCH issues, detailed signaling, PDSCH starting symbol, interaction with CSI feedback, and various other issues.

Regarding legacy carrier types, one issue may be whether or not a UE can assume the same number of CRS antenna ports for the cells participating in CoMP. If so, there is no need to signal the number of number of CRS antenna ports for non-serving cells. This may be simple, but may also be relatively restrictive (e.g., especially considering the possibility of having new carrier type and legacy carrier type using the same carrier frequency). It may be noted that the actual number of CRS antenna ports between serving and non-serving cells can be different, as long as the number of CRS antenna ports of the serving cell is no less than that of the non-serving cell(s), and the UE assumes that the # of CRS antenna ports for non-serving cell(s) is the same as the serving cell.

Otherwise, it may be desirable to signal the number of CRS antenna ports. Ideally, there may be 3 possible values (e.g., 1, 2, or 4 CRS ports) for each non-serving cell in CoMP. This may be simplified by indicating 2 possible values (e.g., 2 or 4 CRS ports), such that only 1-bit information is involved. This may be even further simplified by signaling one (or some small number) value for all cells involved in CoMP, for example, 3 cells in CoMP, but one value of the number of CRS ports for all the 3 cells (e.g., a max for the 3 cells).

CRS configuration may also be subframe type dependent. For example, different RS configurations may be used depending on whether a subframe type is Multicast-Broadcast Single Frequency Network (MBSFN) or non-MBSFN.

If there is no signaling indicating subframe types, same subframe type may be assumed the same as the serving cell, but too restrictive. Instead, different subframe types across cells in CoMP should be allowed.

Assuming subframe-synchronized operation (e.g., all cells have the same subframe index in a given subframe) and same frame structure (e.g., TDD or FDD), then, a certain subset of subframes may have the same type across cells. For example, for subframes 0, 4, 5 and 9 for FDD, or 0, 1, 5, and 6 for TDD, subframe types for all cells with legacy carrier type are the same (e.g., non-MBSFN) since MBSFN cannot be configured with these subframes. For other subframes, subframe type can be different across cells. In that case, one bit to indicate MBSFN vs. non-MBSFN subframe for each of these other 6 subframes. This may be signaled with a bitmap to indicate whether a subframe is MBSFN or not. For example, a 40-bit bitmap may be used to indicate a 40 ms periodicity based configuration.

In some systems, different frequency shifts among cells in CoMP should be supported. Exactly how many shifts are supported (e.g., and signaled) may be determined, for example, depending on the number of CRS ports. From PDSCH RE mapping perspective, it may not really matter which CRS antenna port(s) are used, but rather which REs are occupied by CRS. Therefore, if there is only one CRS port, the shift may have 6 values; if there are two or more CRS ports, only 3 shift values may be indicated. It may also be possible to consider not supporting signaling of 1 CRS port (e.g., even if there is one CRS port, signaling two CRS ports instead one CRS port for the purpose of PDSCH RE mapping). Ultimately, this decision represents a tradeoff between signaling complexity and PDSCH resource efficiency.

For a new carrier type (NCT), various parameters may affect CRS configurations (e.g., CRS port, subframe index, and/or frequency shift). For cells new carrier type in CoMP, a different signaling scheme may be adopted, for example, depending on how CRS is transmitted. If CRS is only in subframe #0 and #5, with 1 port only, and its bandwidth is fixed, only the frequency shift (e.g., 6 possible values) may be signaled. In some cases, to aid a UE in rate matching, a UE may be indicated whether a cell is of legacy carrier type (LCT) or new carrier type (NCT).

Rather than explicit signaling of CRS parameters, an alternative is implicit signaling. For example, instead of signaling the shift, antenna ports, etc., a UE can be signaled via a physical cell identity (PCI) instead. In this case, the UE may, based on the PCI, derive the corresponding CRS parameters.

In some cases, different cells may have different special subframe configurations. This may be especially true when the feature of dynamic TDD subframe configurations is supported in LTE Rel-12, for example. A UE may be provided with an indication or can blindly detect the special subframe configuration of each cell involved in CoMP. For joint transmission (JT), it is important to ensure all cells in JT have the same number of available REs. In some cases, if two or more cells have different DwPTS lengths, JT may not be allowed among these cells (e.g., only non-JT CoMP is allowed). Alternatively, if JT is supported among cells of different DwPTS lengths, PDSCH is only mapped based on a common resource set (e.g., the smallest DwPTS length) among the cells in JT CoMP. Alternatively, only the subset of cells having the same DwPTS length can be in JT. Channel estimation may also be done differently for regular and special subframes.

In some systems (e.g., LTE Rel-12), different cells may have different TDD subframe configurations. For example, there may be a use case where CoMP (e.g., JT, DPS, CBS, etc.) can be supported among cells with different subframe configurations, and the number of cells involved in DL CoMP and/or UL CoMP can be subframe dependent. For example, with a UL/DL configuration of DSUUDDSUUD in cell 1, and DSUDDDSUDD in cell 2; in subframes 0, 1, 4, 5, 6, and 9, both cells 1 and 2 may be involved in DL CoMP, while in subframes 3 and 8, only cell 2 is involved in DL CoMP; for UL CoMP, in subframes 2 and 7, both cells 1 and 2 are involved while in subframes 3 and 8, only cell 1 is involved. However, for a particular UE, it may be able operate with either DL or UL, but not both.

A UE in CoMP may operate as DL, or UL, or even completely skip a subframe when two or more cells have different DL/UL configurations, where such operation can be according to various alternatives. According to a first alternative, such operation may be dynamically determined (e.g., based on eNB scheduling decisions). According to a second alternative, such operation may be semi-statically configured (e.g., via explicit RRC signaling, or implicitly tied with some RRC configurations, e.g., if CQI is configured to transmit in the subframe, it is UL; otherwise, it is DL).

According to a third alternative, such operation may be hard-coded in the specifications. For example, CoMP may only be supported in subframes of the same link type (e.g., DL or UL). In the same example above, only subframes {0, 1, 4, 5, 6, 9} are supported for DL and only subframes {2, 7} are for UL, while subframes {3, 8} are not used for the UE in CoMP.

Although it is possible that different UEs may operate differently (e.g., some UEs with DL, some with UL) and FDM can be used to minimize mutual interference among UEs, it may be much simpler that from the cell perspective, a subframe is either DL or UL.

If filtering for channel estimation is implemented, it may be done only among the subframes of the same number of CoMP cells. It may be noted that filtering for channel estimation typically is not done across different subframes, due to different precoding operations across subframes. However, if subframe-domain bundling is enabled such that same precoding is applied for multiple subframes, channel estimation filtering may be performed with the subframes.

In some cases, rate matching may be dependent on a particular CoMP scheme. For example, for JT, PDSCH may be rate-matched around combined CRS patterns of the CRS configurations of two or more of the cells in CoMP. For other non-JT schemes (e.g., DPS), PDSCH rate matching may be done on a per-cell basis.

For a particular UE, dynamic switching between CoMP schemes (e.g., between JT and DPS) may be possible. There may be various alternatives. For example, for a first alternative, the UE is informed of a number of CRS configuration sets and performs rate matching based on one of the sets in any subframe. This alternative may involve no additional processing at the UE involving interaction of different sets of configurations. The configuration set itself may handle JT vs. non-JT operations.

For a second alternative, UEs may be informed of a number of CRS configuration sets and may perform rate matching based on two or more sets, at least in some subframes. This alternative may entail additional processing at the UE on how to combine two or more sets. The UE may most likely be informed when and/or how to perform the additional processing.

The rate matching of other reference signals, such as non-zero power (NZP) CSI-RS and/or zero power (ZP) CSI-RS, may also be tied to the above configuration sets. This enables transmission points, among which a UE may perform dynamic point selection, to have different NZP CSI-RS and/or ZP CSI-RS configurations. In this manner, the rate matching of a UE may be made dependent on which of the points is performing the PDSCH transmission to the UE. In a given subframe, the UE may be signaled one configuration set containing the NZP CSI-RS and/or ZP CSI-RS configuration applicable to that subframe.

In aspects, the rate matching of NZP and ZP CSI-RS resources may be performed differently. As NZP CSI-RS resources are used by the UE for channel measurement, it may be desirable to perform rate matching around all configured NZP CSI-RS resources (e.g., all configured NZP CSI-RS contained in the CoMP measurement set). One benefit of this is that the network need not configure overlapping ZP CSI-RS resources to enforce the corresponding rate matching. Moreover, since NZP CSI-RS may occupy less than 4 resource elements (e.g., whereas ZP CSI-RS resources have a granularity of 4 resource elements), there may be some flexibility benefits in terms of overhead. Similarly, in another aspect, instead of rate matching around all NZP CSI-RS resources as described above, the UE may rate match around a fixed subset of NZP CSI-RS resources, such as the NZP CSI-RS resource associated with the serving cell.

Another aspect concerns how the rate matching of ZP CSI-RS resources relates to the one or more interference measurement resources (IMRs) that can be semi-statically configured for a UE. In one aspect, it may be desirable to enforce that all IMRs configured for one UE are associated with (e.g., covered by) ZP CSI-RS resources in any given subframe. This ensures that the corresponding REs can be used for interference measurement by the UE regardless of the rate matching set dynamically signaled to the UE. In this scenario, the network may ensure that accurate interference conditions are created for the IMR resource elements by transmitting arbitrary (e.g., non-PDSCH) signals to create the desired interference conditions.

In another aspect, rate matching may be performed solely based on the ZP CSI-RS configuration associated with the configuration state indicated to the UE. In this case, some IMR resource elements may not be rate matched around in some subframes, thereby leading the UE to count its own PDSCH interference as interference on the IMR REs. This is not desirable from an accuracy standpoint because, by counting its own PDSCH as interference, the UE may perform the interference measurement under an incorrect precoding assumption. However, this scheme has the benefit of slightly reduced overhead.

In some cases, rate matching may be subframe dependent. For example, as discussed earlier, rate matching can be done differently for MBSFN vs. non-MBSFN subframes. For example, different sets of CRS configurations can be defined for MBSFN vs. non-MBSFN subframes. The UE, based on the current subframe type (e.g., MBSFN vs. non-MBSFN), determines which set to use for PDSCH rate matching.

If CoMP under different TDD DL/UL configurations is supported, PDSCH rate matching may further depend on the combination of UL and DL subframes involved in CoMP. For example, for subframes where all cells have DL subframes, define a first set of CRS configurations and/or for subframes where some cells have DL subframes and other cells have UL subframes, define a second set of CRS configurations. The UE, based on the current combination of DL and UL subframes of the cells in CoMP, determine which set to use for PDSCH rate matching.

In some cases, different rate matching may be performed based on different RBs. For example, if CoMP with distributed PDSCH resource allocations is supported, rate matching can further be differently done on different portions of the assigned PDSCH resources. For example, assuming a PDSCH is assigned with 4 resource blocks, the first 2 coming from cell 1, and the other 2 coming from cell 2. In this case, the first 2 resource blocks may have rate matching based on cell 1 CRS configuration, while the second 2 resource blocks may have rate matching based on cell 2 CRS configuration. As another example, the presence of CRS in a new carrier type may be limited to a fraction of a system bandwidth. As a result, depending on the assigned resources for PDSCH and the RBs carrying CRS, rate matching may have to be done differently.

It may be noted that if PRG (precoding RB group) is supported, the same rate matching may be applied to resource blocks (RBs) of the same PRG.

Rate matching around NZP and/or ZP CSI-RS resources may be based on the paging configuration and/or other configuration associated with specific transmission points. In one aspect, the transmission of paging information and other channels such as PSS/SSS, PBCH, or SIB1 may take priority over NZP or ZP CSI-RS transmission. In the absence of CoMP, the UE may be aware of the transmission times associated with the paging information based on the configuration of its serving cell. However, in CoMP the UE may not be able to determine the transmission times of these channels from the configuration of its serving cell as the transmission times could potentially differ among the transmission points involved in CoMP operation.

In some systems, it has been considered that the UE could be informed of paging related configuration parameters by signaling such paging-related configuration parameters as part of the CSI-RS configuration. This includes parameters such as the default paging cycle and the parameter "nB" (as described in LTE Technical Specification (TS) TS36.331, TS36.304), where nB may be 4T, 2T, T, T/2, T/4, T/8, T/16 or T/32, and T is a DRX cycle of the UE. T is determined by the shortest of the UE specific DRX value, if allocated by upper layers, and a default DRX value broadcast in system information. If UE specific DRX is not configured by upper layers, the default value is applied. As described earlier, the purpose of signaling such information to the UE is to make it aware of when a specific CSI-RS instance should be dropped to perform rate matching in line with this assumption. However, this signaling may be limited to providing such information only semi-statically.

In aspects, the signaling of paging-related configuration parameters may be performed differently in other systems. Instead of including such parameters as part of the NZP and/or ZP CSI-RS configuration, they may be incorporated into one or more of reference signal configuration sets (e.g., on which rate matching configuration states may be based) described earlier. This allows for dynamic indication of whether or not CSI-RS and paging are coincident which is useful as it improves the network's flexibility of informing the UE of such potential collisions.

Incorporating paging-related configuration parameters into the reference signal configuration sets may be performed in many ways.

In a first aspect, a field may be employed that informs the UE explicitly whether or not the subframe is a paging subframe. In this manner, the network may configure at least two configuration sets to inform the UE dynamically, for example, about paging occasions (e.g., one state would have the paging field set to true, while the other one would have this field set to false). In this case the dynamic signaling is enabled based on the network's ability to dynamically inform the UE of which reference signal configuration set should be assumed in a given subframe.

In a second aspect, one or more fields may be employed that inform the UE when paging occasions occur for various transmission points. Paging-related configuration parameters such as the default paging cycle and/or the parameter "nB", for example, may be added to one or more of the reference signal rate matching configuration sets, based on which the UE may determine whether a specific subframe is a paging occasion using the same methods as if these parameters were provided as part of the serving cell. In such aspects, a rate matching reference signal configuration may be associated with a specific transmission point or a set of transmission points; adding these paging related parameters therefore informs the UE of the paging occasions of those points. In aspects, the added fields may be optional so that the network has the ability not to provide any paging information as part of a reference signal configuration. This may be desirable, for example, if the network wants the UE to assume that a paging occasion never occurs.

The above signaling aspects inform the UE through signaling (e.g., dynamic signaling) whether a paging occasion should be assumed in a given subframe. In addition to providing this information, the configurations may also specify which NZP- and/or ZP CSI-RS resources should be assumed as affected by the paging occasion. This is useful because paging configuration parameters may be different across transmission points and each transmission point may be associated with a separate configuration of NZP and/or ZP CSI-RS. In one embodiment, the UE may assume that the paging occasion applies to NZP CSI-RS specified in the configuration sets (e.g., for quasi-co-location purposes) and/or the ZP CSI-RS configuration specified in the reference signal configurations. As used herein, quasi-co-located generally refers to one or more long-term channel properties (e.g., delay spread, receive power, frequency shift, Doppler spread, and receiver timing) being substantially the same (e.g., within tolerances). In aspects, two antenna ports are said to be quasi co-located if the large-scale properties of the channel over which a symbol on one antenna port is conveyed can be inferred from the channel over which a symbol on the other antenna port is conveyed. In this manner, additional signaling may not be required to identify which NZP and/or ZP CSI-RS resource are affected by the paging. In another embodiment, however, such signaling may be provided explicitly. To wit, additional signaling may be added to the configuration sets to identify a set of NZP and/or ZP CSI-RS resources which are assumed to be affected by the paging occurrence.

The above signaling proposals inform the UE of paging occasions associated with different transmission points. Based on this information, the UE is able to determine or infer when NZP and/or ZP CSI-RS may be dropped due to coincident paging occurrences and may perform rate matching around the NZP/ZP CSI-RS only when it is not dropped. In another aspect, the UE may also use this information to determine when a NZP CSI-RS measurement should be taken. For example, when a NZP CSI-RS is dropped the UE may not take a measurement on the corresponding REs as the reference signal may actually not be present.

Rate matching may also be dependent on interference cancellation (IC) capability. For example, PDSCH rate matching for a UE in CoMP may be performed differently depending on whether the UE is IC capable or not. For example, for IC capable UEs, PDSCH rate matching may be done only around CRS of one cell in CoMP; while IC incapable UEs may be done around CRS of multiple cells in CoMP. Even for IC-capable UEs, different rate matching may be done depending on whether IC is enabled or not. For example, IC may be disabled if UE is close to battery outage, and if so, a different set of CRS configuration for PDSCH rate matching may be defined for the UE.

Rate matching may also be dependent on a particular channel and/or channel parameters. For example, while various examples herein have focused on PDSCH rate matching, similar issues and solutions may also be applied to other control channels, such as legacy PDCCH, or new "enhanced" PDCCH (ePDCCH). However, PDCCH, ePDCCH, and/or PDSCH for a UE in CoMP may have different rate matching schemes. For example, a UE may be configured with ePDCCH, where PDCCH is in a common search space and ePDCCH is in UE-specific search space. In this example, the following rate matching may be adopted: the UE is configured with 2 sets of CRS configurations for rate matching, PDCCH rate matching is the same as non-CoMP (e.g., based on serving cell CRS), ePDCCH rate matching is based on the first set of CRS configuration, and/or PDSCH may be based on non-CoMP and the configured 2 sets, depending on how PDSCH is scheduled, and/or its type (e.g., unicast or broadcast).

Additional ePDCCH specific rate matching details may also be provided. For example, generally, rate matching for ePDCCH may take the following design alternatives. In a first alternative, there may be no new rate matching (RM) for ePDCCH (e.g., based on serving cell CRS). For a second alternative, ePDCCH RM may be based on a single set of CRS configuration. A UE may use one set defined for PDSCH (e.g., the first set defined for PDSCH) and/or a set specifically configured for ePDCCH (e.g., separate from the one(s) defined for PDSCH). For a third alternative, ePDCCH RM may be based on two or more sets of CRS configurations. In such cases, there may be implicit linkage (e.g., subframe index, decoding candidate, virtual cell ID, etc.) of which set to use in a subframe (or for a candidate) has to be defined in order to not increase the max number of blind decodes.

The ePDCCH rate matching may further reuse the signaling of paging-related configuration parameters as discussed above. In one aspect, the rate matching configuration states defined for PDSCH may be reused for ePDCCH and associated with one or more ePDCCH resource sets. Each ePDCCH set may correspond to a specific set of resources (e.g., specific PRB pairs) and may be linked with one of the PDSCH rate matching configuration states. In this example, the UE may thus make different rate matching assumptions depending on the ePDCCH resource set. This may, in particular, include paging-related assumptions.

In addition, or as an alternative, RM for different ePDCCH decoding candidates may be different. For example, depending on whether the candidates are in a common or UE-specific search space, depending on whether the candidates are based on localized or distributed transmissions, and/or depending on aggregation levels.

Enhanced PCFICH and enhanced Physical HARQ (Hybrid Automatic Repeat Request) Indicator Channel (PHICH) RM may also be based on the serving cell. Various other alternatives may also be considered, such as RM based on some RRC configuration.

In some cases, it may be desirable to provide fallback operation in the event of UE reconfiguration. For example, upon reconfiguration of rate matching parameters, there may be at least one PDSCH RE mapping scheme irrespective of the reconfiguration in order to maintain a link between the UE and the eNB. The fallback PDSCH RE mapping can be always based on the serving cell CRS only. The fallback PDSCH RE mapping can be linked with control channel type (e.g., PDCCH vs. ePDCCH), common search space, a particular Downlink Control Information (DCI) format (e.g., 1A), particular aggregation level(s), particular decoding candidate(s), or a combination thereof. For example, for PDSCH scheduled via PDCCH from common search space, PDSCH rate matching may always be based on the serving cell (e.g., the same as non-CoMP operation). It may be noted that there may be ambiguity regarding whether PDCCH is from a common search space or UE-specific search space when the two search spaces overlap, and if so, the UE may assume that PDCCH from the common search space takes precedence. For example, the UE may assume PDSCH operation is based on the one defined for PDCCH from common search space.

Alternatively, fallback operation may be achieved by ensuring that upon reconfiguration, there is at least one set unchanged. In this case, it may also be desirable to ensure that the same set index is maintained. For example, the UE may be configured with two sets (set 1 and set 2). To ensure seamless operation, the reconfiguration can follow: {1, 2}→{1, 2'} (second set is reconfigured, but first set remains unchanged)→{1', 2'}.

As described herein, rate matching may be performed based on one or more RS configurations. As an example, a UE may be configured with N RS sets. In this case, the UE may handle (N+1) PDSCH rate matching schemes. The additional one is due to fallback (e.g., rate matching based on non-CoMP operation) based on serving cell CRS.

In some cases, the number of CRS configuration sets, N, may be designed to balance the tradeoff between complexity and flexibility. In a first alternative, N≥2, the set in use may be based on virtual cell ID (e.g., or nSCID) and potential more bits. For example, with N=2, where DCI format 1A in common search space triggers legacy rate matching, DCI format 1A in UE specific search triggers rate matching based on the first set configuration, and DCI format 2C triggers rate matching based on either the first set or the second set configuration depending on nSCID.

In another alternative, with N≥2, the one in use is based in part on some control channel property. For example, if PDCCH is scheduled, one set, if ePDCCH is not scheduled, another set; or search space dependent (e.g., common vs. UE-specific), localized vs. distributed ePDCCH, DCI format dependent (e.g., 1A vs. 2C triggering different sets of parameters), aggregation level dependent, decoding candidate dependent, and/or UE capability dependent (e.g., IC capable vs. not, by RRC configuration).

As another alternative, with N=1, a UE may still switch between legacy (e.g., serving cell CRS based) and one configured set. For example, DCI format 1A, legacy set; DCI format 2C, configured set.

As still another alternative, with N≥2, there may be implicit linkage (e.g., with subframe index). Any combination of these alternatives may also be utilized.

In some cases, starting symbols of a downlink transmission may be Cell Dependent. For example, the starting symbol for PDSCH in CoMP can be layer 3 signaled. Since different cells may have different control region sizes (e.g., including zero legacy control region for new carrier type), the starting symbol index for PDSCH in CoMP may be ideally cell-dependent. For example, based on the virtual cell ID in use (e.g., equivalently, depending on the value of nSCID). If nSCID=0, a first starting symbol; if nSCID=1, a second starting symbol. However, for JT CoMP, the starting symbol for cells in CoMP typically should be the same.

In some cases, a UE may be semi-statically or dynamically indicated PDSCH starting symbol. As an example, in Case 1: a UE can be configured with a single starting symbol index, mainly targeting JT CoMP; in Case 2: a UE is configured with two starting symbol indices, and determines which one to use based on virtual cell ID, which is particularly useful for non-JT CoMP schemes such as DPS; in Case 3: a UE is configured with two starting symbol indices, and is further separately indicated which one to use; and in Case 4: a UE is configured with two starting symbol indices, and is further indicated the CoMP scheme (e.g., JT vs. non-JT). If non-JT, the one use may be based on virtual cell ID; if JT, always uses the first starting symbol index.

As noted above, for fallback, the starting symbol for some PDSCH transmissions may always follow the non-CoMP case (e.g., based on serving cell PCFICH). For example, when PDSCH is scheduled via control from common search space.

For new carrier type (NCT), there may not be legacy control; however, there may still be a desire to specify the starting symbol for PDSCH. For example, CoMP may involve cells of both legacy carrier type (LCT) and NCT. As a result, two or more PDSCH starting symbols may be defined. Again, for fallback, the starting PDSCH symbol for some PDSCH transmissions may be based on the serving cell. If the serving cell is NCT, the PDSCH may start from the first symbol.

In some cases, the starting PDSCH symbol may depend on whether PDSCH is scheduled via PDCCH or ePDCCH. As an example, if PDSCH is scheduled by PDCCH, the starting PDSCH symbol may be determined based on PCFICH (e.g., with the starting symbol immediately after the control region size indicated by PCFICH). If PDSCH is scheduled by ePDCCH, the starting PDSCH symbol may be determined based on an RRC configuration. The presence of PDCCH or ePDCCH for a UE may be subframe dependent. In addition, for a PDSCH without a corresponding control channel (e.g., a semi-persistently scheduled PDSCH), the starting symbol index can be either based on PCFICH or an RRC configuration.

The determination can also be subframe dependent. For example, if a UE is configured to monitor ePDCCH in a subframe, the starting PDSCH symbol without the corresponding control channel may be determined based on an RRC configuration. If the UE is configured to monitor PDCCH in a subframe, the starting PDSCH symbol without the corresponding control channel may be determined based on PCFICH.

As another example, if a semi-persistent scheduling (SPS) PDSCH is activated by PDCCH, the starting PDSCH symbol index may be based on PCFICH. If an SPS PDSCH is activated by ePDCCH, the starting PDSCH symbol index can be based on an RRC configuration, if configured. As another example, the starting PDSCH symbol of an SPS PDSCH can be always based on an RRC configuration, particularly when ePDCCH is configured for the UE. As yet another example, a UE may be provided an indication in an SPS activation control channel (e.g., either via PDCCH or ePDCCH) of whether the starting PDSCH starting symbol of the SPS PDSCH during the activated period should be based on PCFICH or an RRC configuration.

In some cases, there may be a dependency between PDSCH rate matching and channel state information (CSI) feedback. The number of resource elements available for PDSCH depends on the rate matching scheme. Since PDSCH rate matching has two or more schemes, there are two or more possible numbers of available resources for PDSCH.

This would ideally impact CSI feedback. For CoMP, a UE may be configured with two or more CSI feedbacks. It may, thus, be preferable to link CSI feedback with PDSCH rate matching schemes. For example, 3 CSI feedback configurations may be provided: one mapped to legacy PDSCH RM, one to RM based on the first set of CRS configurations for PDSCH RM, and another one to RM based on the second set of CRS configurations for PDSCH RM.

In some cases, such linkage may be transparent to the UE (eNB implementation) or indicated to the UE. For example, different CSI feedback configurations are linked with different RM options, such that the number of REs discounting for CRS is differently done for different CSI feedback configurations.

In some cases, CoMP PDSCH rate matching may accommodate carrier aggregation. For example, it is expected that rate matching for PDSCH in CoMP may be done on a per-carrier basis if a UE is configured with two or more carriers.

Figure 8:
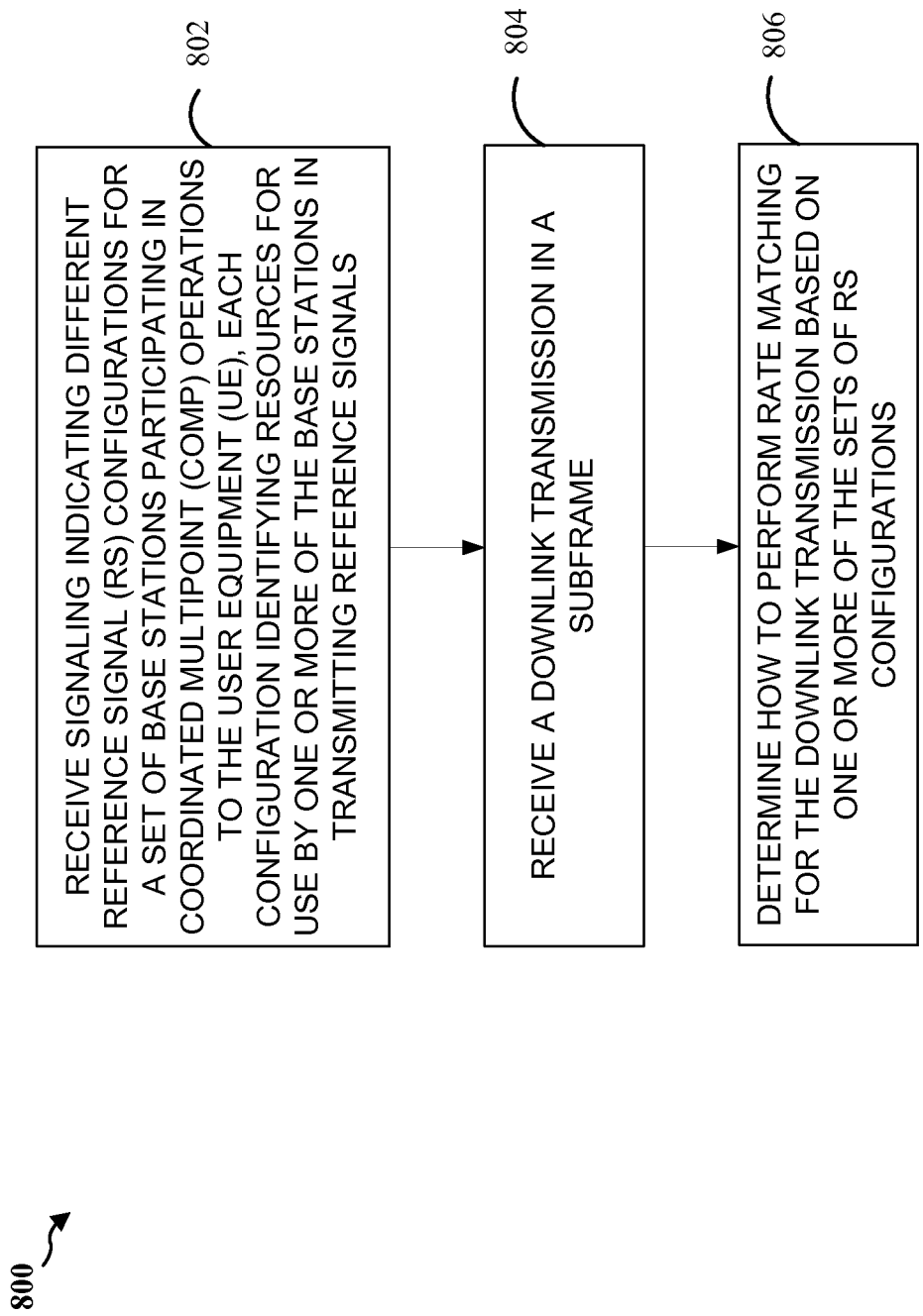
FIG. 8 illustrates example operations 800 that may be performed by a UE to process CoMP transmissions, in accordance with certain aspects of the present disclosure.

FIG. 8 illustrates example operations 800 that may be performed by a user equipment (UE) to process CoMP transmissions, in accordance with certain aspects of the present disclosure. The operations begin, at 802, by receiving signaling indicating different reference signal (RS) configurations for a set of base stations participating in Coordinated Multipoint (CoMP) operations to the UE, each configuration identifying resources for use by one or more of the base stations in transmitting reference signals. At 804, the UE receives a downlink transmission in a subframe. At 806, the UE determines how to perform rate matching for the downlink transmission based on one or more of the RS configurations.

The techniques presented herein may allow for efficient use of data REs in CoMP operations. The techniques presented herein may be applied in CoMP networks utilizing base stations of the same power class (e.g., homogenous networks) or CoMP networks utilizing base stations of different power classes (e.g., heterogeneous networks), as well as networks utilizing relays and remote radio heads (RRHs).

As noted above, various mechanisms may be provided to configure a UE with different starting symbol indices and the UE may determine which starting index to use for a particular DL CoMP transmission based on variety of factors. For example, the UE may determine the staring symbol index based on signaling from a base station, a cell ID, virtual cell ID, nSCID, and/or what type of control channel scheduled the DL transmission.

Figure 9:
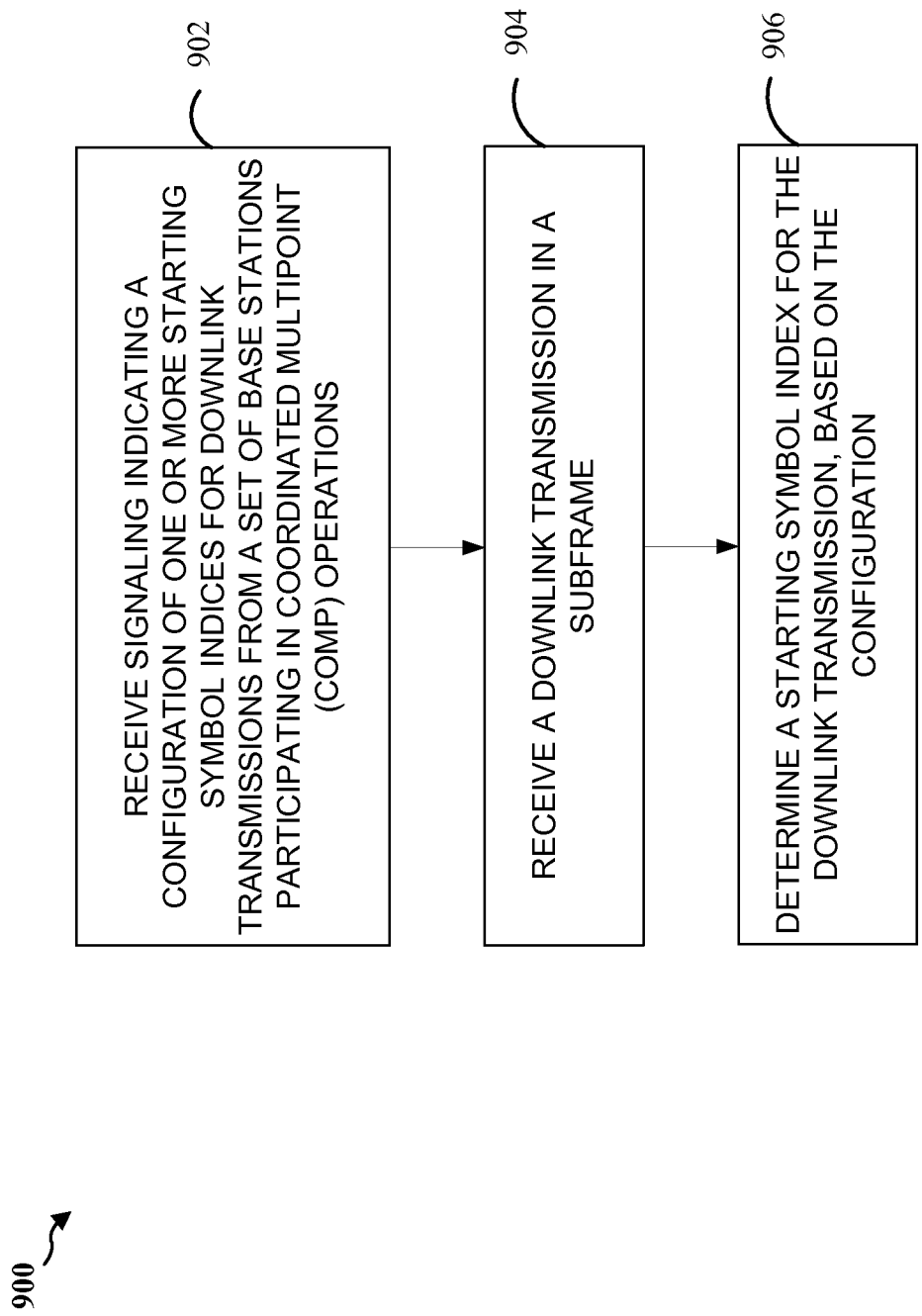
FIG. 9 illustrates example operations 900 that may be performed by a UE to process CoMP transmissions, in accordance with certain aspects of the present disclosure.

FIG. 9 illustrates example operations 900 that may be performed by a user equipment (UE) to process CoMP transmissions, in accordance with certain aspects of the present disclosure. The operations begin, at 902, by receiving signaling indicating a configuration of one or more starting symbol indices for downlink transmissions from a set of base stations participating in coordinated multipoint (CoMP) operations. At 904, the UE receives a downlink transmission in a subframe. At 906, the UE determines a starting symbol index for the downlink transmission based on the configuration.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components capable of performing such operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

As used herein, a phrase referring to "at least one of" a list of items refers to any combination of those items, including single members. As an example, "at least one of: a, b, or c" is intended to cover: a, b, c, a-b, a-c, b-c, and a-b-c.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications by a user equipment (UE), comprising:
   receiving signaling indicating different reference signal (RS) configurations for a set of base stations participating in Coordinated Multipoint (CoMP) operations to the user equipment (UE), each configuration identifying resources for use by one or more of the base stations in transmitting RSs;
   receiving a downlink transmission in a subframe;
   determining how to perform rate matching for the downlink transmission based on one or more of the indicated RS configurations;
   determining quasi-co-location of one or more resources in the subframe based on the one or more of the indicated RS configurations; and
   performing rate matching based on the determination of how to perform rate matching, wherein:
      different base stations in the set support different uplink/downlink (UL/DL) time division duplexed (TDD) subframe configurations; and
      the number of base stations participating in CoMP operations for any given subframe is dependent on the UL/DL TDD subframe configurations.

2. The method of claim 1, wherein the signaling indicates a number of one or more antenna ports used for transmitting RS.

3. The method of claim 2, wherein the signaling only indicates a number of antenna ports for a serving base station.

4. The method of claim 3, wherein the actual number of antenna ports used by at least one of the base stations is different than the number of antenna ports for the serving base station.

5. The method of claim 1, wherein the set of base stations are synchronized with a same subframe index and, within a period, a first subset of subframes are of a same subframe type.

6. The method of claim 5, further comprising:
   receiving signaling indicating a subframe type of a subframe that is not in the first subset and in which the downlink transmission is received; and
   performing the rate matching based on a RS configuration selected based on the indicated subframe type.

7. The method of claim 6, wherein the first set of subframes comprise subframes of a type other than Multicast-Broadcast Single Frequency Network (MBSFN) subframes.

8. The method of claim 1, wherein the signaling comprises an indication of one or more frequency shift values.

9. The method of claim 8, wherein the number of possible frequency shift values is dependent on a corresponding number of antenna ports.

10. The method of claim 1, wherein at least one of the base stations transmit RS in a new carrier type in a limited number of subframes.

11. The method of claim 10, further comprising receiving an indication of whether or not a base station transmits using a new carrier type and rate matching is performed in a manner dependent, at least in part, on the indication.

12. The method of claim 1, wherein the signaling is conveyed via one or more physical cell identities (PCIs) and the method further comprises deriving the RS configurations based on the PCIs.

13. The method of claim 1, wherein at least some of the base stations in the set have different special subframe configurations.

14. The method of claim 13, wherein receiving signaling comprises receiving an indication of one or more special subframe configurations.

15. The method of claim 13, wherein joint transmissions are not allowed from base stations with different special subframe configurations.

16. The method of claim 13, wherein joint transmissions are allowed from base stations with different special subframe configurations using a common resource set.

17. The method of claim 13, wherein joint transmissions are allowed only from base stations with special subframe configurations with same Downlink Pilot Time Slot (DwPTS) lengths.

18. The method of claim 1, wherein only base stations that have a same subframe uplink or downlink type in a given subframe participate in CoMP operations in that subframe.

19. The method of claim 1, further comprising performing channel estimation filtering only among subframes in which a same number of base stations participate in CoMP operations.

20. The method of claim 1, wherein rate matching is performed in a manner dependent, at least in part, on a CoMP scheme.

21. The method of claim 20, wherein for a joint transmission (JT) CoMP scheme, rate matching is performed based on a combination of RS configurations for base stations involved in the joint transmission.

22. The method of claim 20, wherein for non-JT CoMP schemes, rate matching is performed based on individual RS configurations.

23. The method of claim 1, wherein the signaling comprises an indication of a number of RS configurations.

24. The method of claim 23, wherein, in a given subframe, the rate matching is performed based on a single one of the RS configurations.

25. The method of claim 23, wherein, in a given subframe, the rate matching is performed based on a combination of RS configurations.

26. The method of claim 1, wherein:
   a first RS configuration is defined for subframes where all base stations have DL subframes;
   a second RS configuration is defined for subframes where some base stations have DL subframes and some base stations have UL subframes; and the UE performs rate matching by employing the first or second RS configuration based on a current combination of DL and UL subframes for the subframe in which the downlink transmission is received.

27. The method of claim 1, wherein:
a first portion of the downlink transmission is received from a first base station;
a second portion of the downlink transmission is received from a second base station;
rate matching for the first portion of the downlink transmission is performed based on an RS configuration for the first base station; and
rate matching for the second portion of the downlink transmission is performed based on an RS configuration for the second base station.

28. The method of claim 1, wherein rate matching is performed in a manner dependent on whether or not the UE is interference cancelation (IC) capable.

29. The method of claim 28, wherein:
rate matching is performed based on a single base station RS configuration if the UE is IC capable; and
rate matching is performed based on a combination of base station RS configurations if the UE is not IC capable.

30. The method of claim 28, wherein rate matching is performed in a manner also dependent on whether or not IC is enabled for the UE.

31. The method of claim 1, wherein rate matching is performed in a manner dependent on one or more features of a channel type of the downlink transmission.

32. The method of claim 31, wherein a first RS configuration corresponding to a serving base station is used for rate matching if the downlink transmission comprises a physical downlink control channel (PDCCH).

33. The method of claim 32, wherein a second RS configuration is used for rate matching if the downlink transmission comprises an enhanced physical downlink control channel (ePDCCH) transmitted using resources conventionally used for a physical downlink shared channel (PDSCH).

34. The method of claim 32, wherein different RS configurations may be used for rate matching depending on whether the downlink transmission is unicast or non-unicast.

35. The method of claim 32, wherein different RS configurations may be used for rate matching depending on whether the downlink transmission comprises a physical downlink shared channel (PDSCH) or an enhanced physical downlink control channel (ePDCCH) transmitted using resources conventionally used for PDSCH.

36. The method of claim 1, wherein at least one of the RS configurations is maintained unchanged after a reconfiguration of the UE.

37. The method of claim 1, wherein:
the UE is configured with N RS configurations; and
a particular RS configuration used for rate matching is determined based, at least in part, on a virtual cell ID.

38. The method of claim 37, wherein the particular RS configuration used for rate matching is also determined based, at least in part, on a DCI format.

39. The method of claim 1, wherein:
the UE is configured with N RS configurations; and
a particular RS configuration used for rate matching is determined based, at least in part, on dynamic signaling.

40. The method of claim 39, wherein the particular RS configuration is determined based, at least in part, on a number of explicit bits.

41. The method of claim 39, wherein the particular RS configuration is determined based, at least in part, on a subframe index.

42. The method of claim 1, wherein a starting symbol of the downlink transmission is cell-dependent.

43. The method of claim 42, wherein the starting symbol of the downlink transmission is dependent on a virtual cell ID.

44. The method of claim 1, wherein a starting symbol of the downlink transmission is based, at least in part, on a CoMP scheme.

45. The method of claim 1, wherein a starting symbol of the downlink transmission is based, at least in part, on a carrier type used for the downlink transmission.

46. The method of claim 1, further comprising providing channel state information (CSI) feedback, wherein the UE has at least two CSI feedback configurations based on one or more RS configurations used for rate matching.

47. The method of claim 1, wherein a starting symbol of the downlink transmission is based, at least in part, on a type of control channel associated with the downlink transmission.

48. The method of claim 1, wherein a starting symbol of the downlink transmission is based, at least in part, on an RS configuration state.

49. The method of claim 48, wherein the particular RS configuration is determined based, at least in part, on a number of explicit bits.

50. The method of claim 48, wherein the particular RS configuration is determined based, at least in part, on a type of control channel associated with the downlink transmission.

51. The method of claim 48, wherein the particular RS configuration is determined based, at least in part, on a subframe index.

52. The method of claim 48, wherein:
the downlink transmission does not have a corresponding control channel; and
a starting symbol of the downlink transmission is based, at least in part, on a radio resource control (RRC) or Physical Control Format Indicator Channel (PCFICH) configuration.

53. The method of claim 52, wherein the downlink transmission is semi-persistently scheduled.

54. The method of claim 53, wherein the downlink transmission is on a semi-persistently scheduled channel and the starting symbol of the downlink transmission is further based on a control channel that activates the semi-persistently scheduled channel.

55. The method of claim 53, wherein the downlink transmission is on a semi-persistently scheduled channel and a starting symbol of the downlink transmission is indicated on a control channel that activates the semi-persistently scheduled channel.

56. The method of claim 1, wherein the starting symbol of the downlink transmission is further based on a control channel the UE is configured to monitor.

57. The method of claim 1, wherein the RS configurations include at least one of non-zero power (NZP) CSI-RS configurations or zero power (ZP) CSI-RS configurations.

58. The method of claim 57, wherein the determining includes rate matching around a fixed subset of NZP CSI-RS or ZP CSI-RS resources.

59. The method of claim 57, wherein an interference measurement resources (INRs) configuration is associated with a ZP CSI-RS configuration.

60. The method of claim 1, further comprising assuming an RS configuration shares one or more paging-related configuration parameters based on the determined quasi-co-location.

61. A method for wireless communications by a user equipment (UE), comprising:
receiving signaling indicating a configuration of one or more starting symbol indices for downlink transmissions from a set of base stations participating in coordinated multipoint (CoMP) operations;
receiving a downlink transmission in a subframe; and
determining a starting symbol index for the downlink transmission based on the indicated configuration, wherein the determining comprises determining a starting symbol of the downlink transmission based, at least in part, on a carrier type used for the downlink transmission.

62. The method of claim 61, wherein the determining comprises determining a starting symbol of the downlink transmission based, at least in part, on a cell ID.

63. The method of claim 62, wherein the determining comprises determining a starting symbol of the downlink transmission based, at least in part, on a virtual cell ID.

64. The method of claim 62, wherein the determining comprises determining a starting symbol of the downlink transmission based, at least in part, on a CoMP scheme.

65. The method of claim 62, wherein the determining comprises determining a starting symbol of the downlink transmission based, at least in part, on a type of control channel associated with the downlink transmission.

66. The method of claim 62, wherein:
the downlink transmission does not have a corresponding control channel; and
the determining comprises determining a starting symbol of the downlink transmission based, at least in part, on a radio resource control (RRC) or Physical Control Format Indicator Channel (PCFICH) configuration.

67. The method of claim 62, wherein the downlink transmission is semi-persistently scheduled.

68. The method of claim 67, wherein the downlink transmission is on a semi-persistently scheduled channel and the starting symbol of the downlink transmission is based, at least in part, on a control channel that activates the semi-persistently scheduled channel.

69. The method of claim 67, wherein the downlink transmission is on a semi-persistently scheduled channel and a starting symbol of the downlink transmission is indicated on a control channel that activates the semi-persistently scheduled channel.

70. The method of claim 62, the determining comprises determining a starting symbol of the downlink transmission based, at least in part, on a control channel the UE is configured to monitor.

71. An apparatus for wireless communications by a user equipment (UE), comprising:
means for receiving signaling indicating different reference signal (RS) configurations for a set of base stations participating in Coordinated Multipoint (CoMP) operations to the user equipment (UE), each configuration identifying resources for use by one or more of the base stations in transmitting RSs;
means for receiving a downlink transmission in a subframe;
means for determining how to perform rate matching for the downlink transmission based on one or more of the indicated RS configurations;
means for determining quasi-co-location of one or more resources in the subframe based on the one or more of the RS configurations; and
means for performing rate matching based on the determination of how to perform rate matching, wherein:
different base stations in the set support different uplink/downlink (UL/DL) time division duplexed (TDD) subframe configurations; and
the number of base stations participating in CoMP operations for any given subframe is dependent on the UL/DL TDD subframe configurations.

72. The apparatus of claim 71, wherein the RS configurations include at least one of non-zero power (NZP) CSI-RS configurations or zero power (ZP) CSI-RS configurations.

73. The apparatus of claim 71, wherein the means for determining includes means for rate matching around a fixed subset of NZP CSI-RS or ZP CSI-RS resources.

74. An apparatus for wireless communications by a user equipment (UE), comprising:
means for receiving signaling indicating a configuration of one or more starting symbol indices for downlink transmissions from a set of base stations participating in coordinated multipoint (CoMP) operations;
means for receiving a downlink transmission in a subframe; and
means for determining a starting symbol index for the downlink transmission based on the indicated configuration, wherein the determining comprises determining a starting symbol of the downlink transmission based, at least in part, on a carrier type used for the downlink transmission.

75. The apparatus of claim 74, wherein the means for determining comprises means for determining a starting symbol of the downlink transmission based, at least in part, on a cell ID.

76. An apparatus for wireless communications by a user equipment (UE), comprising:
a receiver configured to receive signaling indicating different reference signal (RS) configurations for a set of base stations participating in Coordinated Multipoint (CoMP) operations to the user equipment (UE), each configuration identifying resources for use by one or more of the base stations in transmitting RSs and to receive a downlink transmission in a subframe; and
a processor configured to determine how to perform rate matching for the downlink transmission based on one or more of the indicated RS configurations and to determine quasi-co-location of one or more resources in the subframe based on the one or more of the RS configurations and perform rate matching based on the determination of how to perform rate matching, wherein:
different base stations in the set support different uplink/downlink (UL/DL) time division duplexed (TDD) subframe configurations; and
the number of base stations participating in CoMP operations for any given subframe is dependent on the UL/DL TDD subframe configurations.

77. The apparatus of claim 76, wherein the RS configurations include at least one of non-zero power (NZP) CSI-RS configurations or zero power (ZP) CSI-RS configurations.

78. The apparatus of claim 76, wherein the processing system is configured to rate match around a fixed subset of NZP CSI-RS or ZP CSI-RS resources.

79. An apparatus for wireless communications by a user equipment (UE), comprising:
- a receiver configured to receive signaling indicating a configuration of one or more starting symbol indices for downlink transmissions from a set of base stations participating in coordinated multipoint (CoMP) operations and to receive a downlink transmission in a subframe; and
- a processor configured to determine a starting symbol index for the downlink transmission based on the indicated configuration by determining a starting symbol of the downlink transmission based, at least in part, on a carrier type used for the downlink transmission.

80. The apparatus of claim 79, wherein the processor is configured to determine a starting symbol of the downlink transmission based, at least in part, on a cell ID.

81. A non-transitory computer readable medium having instructions stored thereon for causing a user equipment (UE) to:
- receive signaling indicating different reference signal (RS) configurations for a set of base stations participating in Coordinated Multipoint (CoMP) operations to the user equipment (UE), each configuration identifying resources for use by one or more of the base stations in transmitting RSs;
- receive a downlink transmission in a subframe;
- determine how to perform rate matching for the downlink transmission based on one or more of the indicated RS configurations;
- determine quasi-co-location of one or more resources in the subframe based on the one or more of the RS configurations; and
- perform rate matching based on the determination of how to perform rate matching, wherein:
  - different base stations in the set support different uplink/downlink (UL/DL) time division duplexed (TDD) subframe configurations; and
  - the number of base stations participating in CoMP operations for any given subframe is dependent on the UL/DL TDD subframe configurations.

82. The non-transitory computer readable medium of claim 81, wherein the RS configurations include at least one of non-zero power (NZP) CSI-RS configurations or zero power (ZP) CSI-RS configurations.

83. The non-transitory computer readable medium of claim 81, wherein the determining includes rate matching around a fixed subset of NZP CSI-RS or ZP CSI-RS resources.

84. A non-transitory computer readable medium having instructions stored thereon for causing a user equipment (UE) to:
- receive signaling indicating a configuration of one or more starting symbol indices for downlink transmissions from a set of base stations participating in coordinated multipoint (CoMP) operations;
- receive a downlink transmission in a subframe; and
- determine a starting symbol index for the downlink transmission based on the indicated configuration by determining a starting symbol of the downlink transmission based, at least in part, on a carrier type used for the downlink transmission.

85. The non-transitory computer readable medium of claim 84, wherein the determining comprises determining a starting symbol of the downlink transmission based, at least in part, on a cell ID.

* * * * *